March 24, 1931.  F. TURRETTINI  1,797,809
MECHANISM FOR ELIMINATING OVERSTRAIN OF MEASURING SPINDLES IN MACHINE TOOLS
Filed May 23, 1929
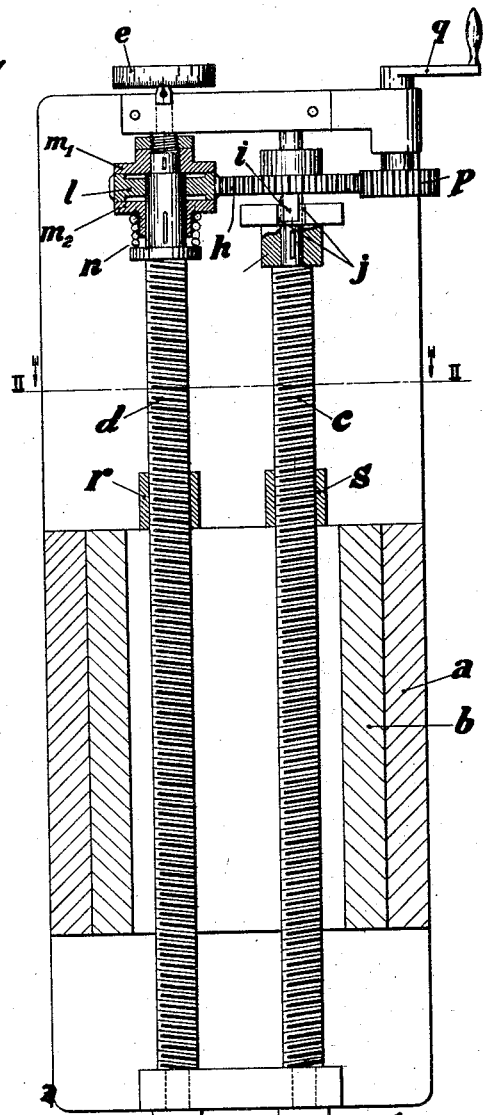
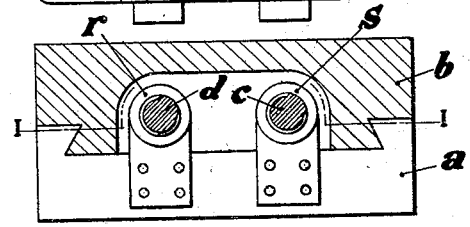
INVENTOR.
F. Turrettini,
BY
ATTORNEYS.

Patented Mar. 24, 1931

1,797,809

UNITED STATES PATENT OFFICE

FERNAND TURRETTINI, OF COLOGNY-GENEVA, SWITZERLAND, ASSIGNOR TO THE FIRM SOCIETE GENEVOISE D'INSTRUMENTS DE PHYSIQUE, OF GENEVA, SWITZERLAND

MECHANISM FOR ELIMINATING OVERSTRAIN OF MEASURING SPINDLES IN MACHINE TOOLS

Application filed May 23, 1929, Serial No. 365,532, and in Switzerland October 13, 1928.

In a large number of machine tools, in particular on lathes, milling machines or boring machines, the following arrangement is found.

The work table or the tool carrying slide is moved by a screw which at the same time has to serve as measuring member. The screw on these machines is frequently provided with a divided circle serving for measuring the amplitude of the displacement which the action of the screw produces.

This arrangement cannot give a guarantee of accurate measurements because the screw which has to move the heavy and resisting slide and at the same time overcome the reaction of the cutting edge of the tool is subjected to wear which is much too rapid.

The object of the present invention is to remove this disadvantage. The invention is characterized by two screws for which the slide block acts as a nut and one of which is adapted to drive this slide block and the other to measure this displacement, by means of a movement transmitting mechanism which is placed between these screws and which is arranged in such a way that it only actuates the measuring screw with a torque which is small enough to avoid every overstraining and wear of the measuring screw.

This arrangement, which implies a division of the functions of movement and measuring, permits the measuring screw to be removed from the effects of wear.

The accompanying drawing illustrates a form of construction of the subject of the invention by way of example.

Fig. 1 is a plan view with a section taken along the line I—I in Fig. 2.

Fig. 2 is a section along the line II—II in Fig. 1.

In this form of construction the slide block is formed by a work table $a$ of a machine tool, which table has to move on a slide bed $b$. $c$ is the driving screw which has to support the whole of the necessary effort employed for moving the table $a$. $d$ is a measuring screw provided with a graduated head $e$ upon which can be read the rotation effected by the screw $d$. $r$ and $s$ are the nuts connecting the screws to the table $a$.

The two screws $c$ and $d$ are coupled together by the following mechanism. A toothed wheel $h$ is loosely mounted upon the screw $c$ but its relative movement with respect to the screw $c$ is limited by a finger $i$ rigid with $h$ which is adapted to move between the two faces $j$ of a recess formed in the sleeve $k$ keyed upon the screw $c$. The toothed wheel $h$ will thus only drive the screw $c$ after its driver $i$ has travelled over the space provided intentionally between the two opposite faces $j$ of the recess formed in the sleeve $k$.

$l$ is a toothed wheel engaging with $h$ mounted without keys upon the screw $d$ and which has to transmit movement to the latter through the medium of a connection limiting the couple which can be transmitted from the wheel $h$ to the screw $d$. This connection is constructed in the form of a friction coupling formed by two plates $m^1$ and $m^2$ keyed upon the screw $d$ but movable axially upon this screw and holding between them the wheel $l$ under the pressure of springs $n$. The torque transmitted by this friction device can be so small that no stresses able to produce wear of the measuring screw $d$ can occur.

The pinion $h$ is moved by a pinion $p$ itself actuated by a crank $q$. Instead of this hand controlling device, the screws can be actuated by any mechanical feed device.

When the crank $q$ is turned the pinion $p$ transmits its rotation to the pinion $h$ and through the latter instantaneously to the screw $d$ by means of the pinion $l$ frictionally coupled to this screw, the effect of which is to bring the threads of the screw $d$ into contact with those of the nut $r$. In fact the torque which the friction coupling can transmit and which is proportional to the dimensions of the latter and to the tension of the spring $n$ is insufficient to displace the table $a$, so that the wheel $l$ will turn without driving the screw $d$.

When the driver $i$ has reached the end of the travel provided for it upon the sleeve $k$, it will positively drive the screw $c$ which thus puts the table $a$ into movement. The latter commences to travel and thus ceases to oppose an unsurmountable resistance to the friction coupling so that the screw $d$ is allowed to commence to turn and thus follows the movement of the table $a$.

In this way the lead screw $c$ is arranged to withstand the whole effort required for moving the table $a$ and the measuring screw $d$ only undergoes the action of a very small torque which is nevertheless just sufficient to ensure the measuring contact on the flanks of the threads of this screw against the flanks of the threads in the nut $r$ rigid with the table $a$. In this way any mechanical fatigue of the screw $d$ is avoided and the latter simply serves as a measuring screw and preserves its accuracy because it is removed from the effect of the wear which would be produced if a resistance had to be overcome.

With a view to eliminating the effect of possible differences in the pitches of the screws $c$ and $d$ or in the accuracy of the wheels $l$ and $h$, which differences will be detrimental to the good working of the arrangement, the transmission ratio of the wheels $l$ and $h$ and the respective value of the pitches of the screws $c$ and $d$ may be combined intentionally in such a way that if the nut $r$ is moved alone by the screw $d$ it will move a little more rapidly than the nut $s$ under the action of the screw $c$. This causes a continual slip of the friction clutch as soon as the members are in movement. This arrangement of the transmission ratio allows the measuring screw $d$ to always follow the motion of the table and, in other words, to feel its exact displacement.

Naturally a device may also be provided for limiting the couple which will be based upon another principle than that of a friction clutch and a driving device different from that shown at $p$ and $q$ in the figure, provided this torque limitation device can operate for both directions of rotation.

I claim:

1. A device for producing the movement of a member on a machine tool and for measuring this movement, comprising a first screw for moving the member, a second screw for measuring the displacement of the member, nuts formed on said member and engaging with the two screws, and a toothed wheel loosely mounted on the driving screw, a sleeve keyed on said screw and having a recess formed in it, one or several driving members on said toothed wheel engaging in said recess and forming a lost motion driving means for said screw, a second toothed wheel freely rotatable on the measuring screw and engaging the toothed wheel on the driving screw, friction plates slidably and nonrotatably mounted on the measuring screw and held in resilient engagement with said second toothed wheel, the resilient frictional pressure being such that slip is produced when the resistance to rotation of the measuring screw is larger than that practically admissible for a very long use without wear or overstraining and corresponding loss of accuracy, means for rotating the toothed wheel on the driving screw and thereby the toothed wheel on the measuring screw.

2. A device for producing the movement of a movable member on a machine tool and for measuring the displacement of the member, comprising a first screw for moving the member, a second screw for measuring the displacement of the member, nuts formed on the member and engaging with the two screws, a gear carried on said first screw, driving means for actuating said gear and thereby rotating said first screw, a second gear operable to rotate said second screw; and a yielding connection between said two gears whereby a fraction only of the torque imparted to said first mentioned gear is transmitted to said second screw.

3. A device for producing the movement of a movable member on a machine tool and for measuring the displacement of the member, comprising a first screw for moving the member, a second screw for measuring the displacement of the member, nuts formed on the member and engaging with the two screws, a gear carried on said first screw, driving means for actuating said gear and thereby rotating said first screw, a second gear operable to rotate said second screw, and a yielding connection between said two gears whereby a fraction only of the torque imparted to said first mentioned gear is transmitted to said second screw, and a lost motion connection between said first mentioned gear and the first screw whereby the drive is transmitted to this first screw with a certain lag with respect to that of the second screw.

4. A device for producing the movement of a movable member on a machine tool and for measuring the displacement of the member, comprising a first screw for moving the member, a second screw for measuring the displacement of the member, nuts formed on the member and engaging with the two screws, a gear carried on said first screw, driving means for actuating said gear and thereby rotating said first screw, a second gear operable to rotate said second screw, and a yielding connection between said two gears whereby a fraction only of the torque imparted to said first mentioned gear is transmitted to said second screw, the transmission ratio of the connection between said two gears and that of the pitches of the two screws being so chosen that if the movable member were moved by the second screw alone it would move a little more rapidly than it is moved by the first screw.

5. A device for producing the movement of a movable member on a machine tool and for measuring the displacement of the member, comprising a first screw for moving the member, a second screw for measuring the displacement of the member, nuts formed on the member and engaging with the two screws, a gear carried on said first screw, driving means for actuating said gear and thereby rotating said first screw, a second gear operable to rotate said second screw, and a yielding connection between said two gears whereby a fraction only of the torque imparted to said first mentioned gear is transmitted to said second screw, a lost motion connection between said first mentioned gear and the first screw whereby the drive is transmitted to this first screw with a certain lag with respect to that of the second screw, and the transmission ratio of the connection between said two gears and that of the pitches of the two screws being so chosen that if the movable member were moved by the second screw alone it would move a little more rapidly than it is moved by the first screw.

6. In a device for producing the movement of a movable member on a machine tool and for measuring the displacement of this member, the combination with a stationary supporting member for said movable member, of a first screw for moving the movable member, a second screw for measuring the movement of this member, said two screws being journalled in one of said members, nuts formed on the other of said members and engaging with the two screws, a gear carried on said first screw, driving means for actuating said gear and thereby rotating said first screw, a second gear operable to rotate said second screw, and a yielding connection between said two gears whereby a fraction only of the torque imparted to said first mentioned gear is transmitted to said second screw.

In testimony whereof I affix my signature.

FERNAND TURRETTINI.